(12) United States Patent
Alzuraiqi et al.

(10) Patent No.: US 11,391,184 B2
(45) Date of Patent: Jul. 19, 2022

(54) PLANT CONTROL APPARATUS, PLANT CONTROL METHOD AND POWER GENERATION PLANT

(71) Applicants: TOSHIBA ENERGY SYSTEMS & SOLUTIONS CORPORATION, Kawasaki (JP); TOSHIBA PLANT SYSTEMS & SERVICES CORPORATION, Kawasaki (JP)

(72) Inventors: Mohammed Ameen Abbas Alzuraiqi, Yokohama (JP); Masayuki Tobo, Kawasaki (JP); Yuta Iwata, Yokohama (JP); Mizu Kajihara, Yokohama (JP); Shinobu Chiba, Fujimi (JP)

(73) Assignees: TOSHIBA ENERGY SYSTEMS & SOLUTIONS CORPORATION, Kawasaki (JP); TOSHIBA PLANT SYSTEMS & SERVICES CORPORATION, Kawasaki (JP)

( * ) Notice: Subject to any disclaimer, the term of this patent is extended or adjusted under 35 U.S.C. 154(b) by 100 days.

(21) Appl. No.: 17/001,756

(22) Filed: Aug. 25, 2020

(65) Prior Publication Data
US 2021/0095579 A1    Apr. 1, 2021

(30) Foreign Application Priority Data

Oct. 1, 2019 (JP) .............................. JP2019-181647

(51) Int. Cl.
 *F01K 13/02*    (2006.01)
 *F01K 23/10*    (2006.01)
 (Continued)

(52) U.S. Cl.
 CPC .............. *F01K 13/02* (2013.01); *F01K 23/10* (2013.01); *F02C 7/36* (2013.01); *F02C 9/42* (2013.01);
 (Continued)

(58) Field of Classification Search
 CPC .. F01K 13/02; F01K 23/10; F02C 7/36; F02C 9/42; F05D 2220/31; F05D 2220/74;
 (Continued)

(56) References Cited

U.S. PATENT DOCUMENTS 5,301,499 A *  4/1994  Kure-Jensen ........... F01K 23/16
                                                  60/773
5,966,925 A * 10/1999  Torikai ..................... F02C 9/32
                                                  60/788
2019/0284963 A1  9/2019  Ngo et al.

FOREIGN PATENT DOCUMENTS

CN       1092757 C      10/2002
JP     2-308903 A       12/1990
(Continued)

*Primary Examiner* — Shafiq Mian
(74) *Attorney, Agent, or Firm* — Oblon, McClelland, Maier & Neustadt, L.L.P.

(57) ABSTRACT

In one embodiment, a plant control apparatus includes a first stop controller configured to, when stopping a plant, stop a steam turbine to start to drop rotating speed of a second shaft of the steam turbine from rated speed, and start to drop rotating speed of a first shaft of a gas turbine from the rated speed while continuing combustion of a combustor after the stop of the steam turbine. The apparatus further includes a second stop controller configured to shut off fuel of the combustor to stop the gas turbine when the rotating speed of the first shaft drops to first speed. The second stop controller stops the gas turbine such that the rotating speed of the first shaft catches up with the rotating speed of the second shaft at second speed that is equal to or lower than the first speed and a clutch is engaged.

11 Claims, 8 Drawing Sheets

(51) Int. Cl.
*F02C 7/36* (2006.01)
*F02C 9/42* (2006.01)

(52) U.S. Cl.
CPC ...... *F05D 2220/31* (2013.01); *F05D 2220/74* (2013.01); *F05D 2240/60* (2013.01); *F05D 2260/4023* (2013.01); *F05D 2270/023* (2013.01); *F05D 2270/09* (2013.01)

(58) Field of Classification Search
CPC ......... F05D 2240/60; F05D 2260/4023; F05D 2270/023; F05D 2270/09
See application file for complete search history.

(56) References Cited

FOREIGN PATENT DOCUMENTS

| | | |
|---|---|---|
| JP | 4-1 48002 A | 5/1992 |
| JP | 2005-180370 A | 7/2005 |
| JP | 2019-157848 A | 9/2019 |

\* cited by examiner

PLANT CONTROL APPARATUS, PLANT CONTROL METHOD AND POWER GENERATION PLANT

CROSS REFERENCE TO RELATED APPLICATION

This application is based upon and claims the benefit of priority from the prior Japanese Patent Application No. 2019-181647, filed on Oct. 1, 2019, the entire contents of which are incorporated herein by reference.

FIELD

Embodiments described herein relate to a plant control apparatus, a plant control method and a power generation plant.

BACKGROUND

There has been known a combined cycle (C/C) power generation plant configured by combining a combustor, a gas turbine, an exhaust heat recovery boiler and a steam turbine. The combustor burns fuel to discharge combustion gas. The gas turbine is driven by the combustion gas supplied from the combustor. The exhaust heat recovery boiler recovers heat from exhaust gas of the gas turbine to generate steam. The steam turbine is driven by the steam generated by the exhaust heat recovery boiler.

DETAILED DESCRIPTION

Figure 1:
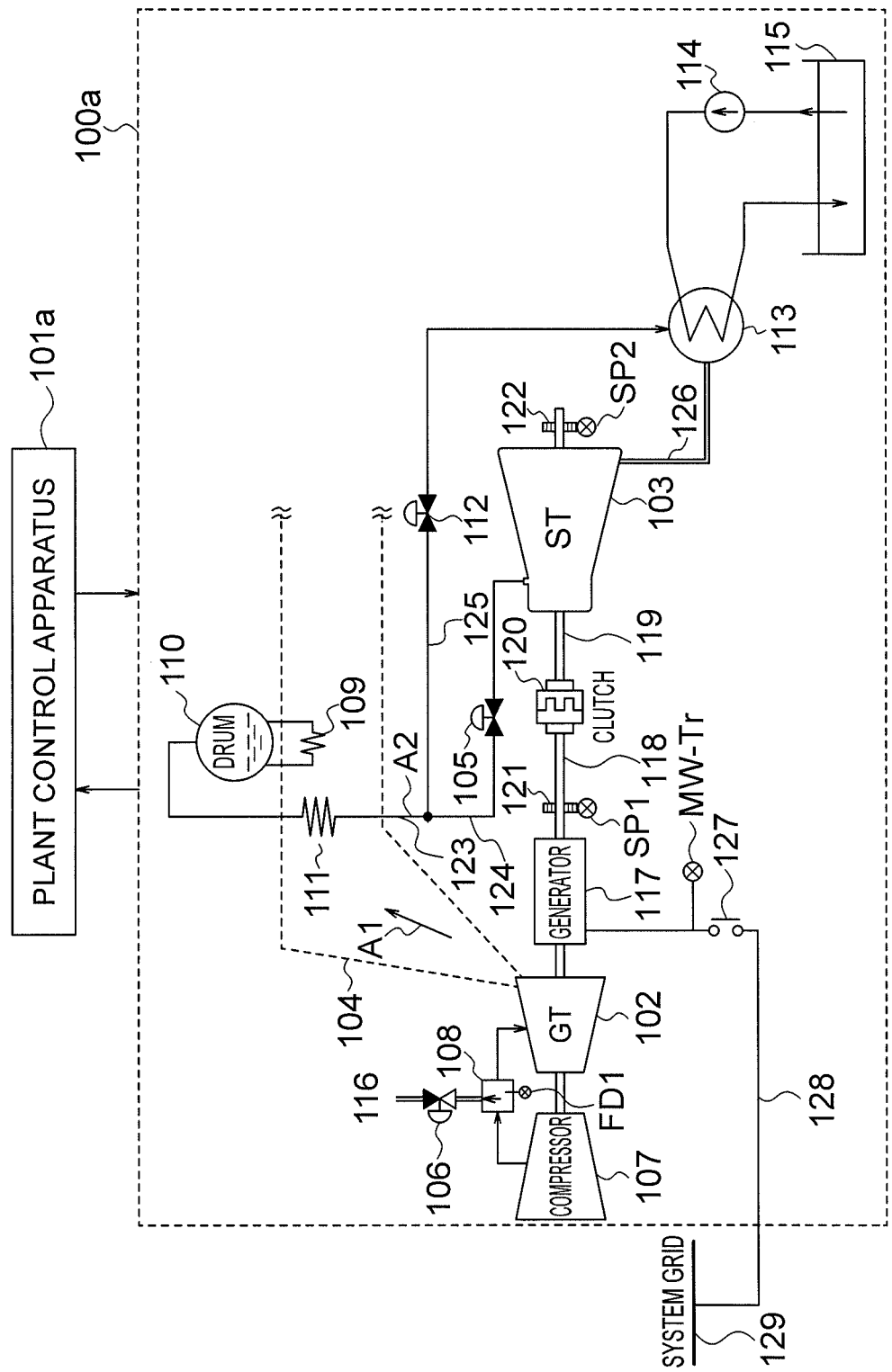
FIG. 1 is a schematic diagram showing the configuration of a power generation plant in a first embodiment.

In a C/C power generation plant of a rigid connection type, a gas turbine and a steam turbine are coupled to the same rotating shaft. On the other hand, in a C/C power generation plant of a clutch connection type, a gas turbine is coupled to a first rotating shaft and a steam turbine is coupled to a second rotating shaft. The first rotating shaft is connected to or disconnected from the second rotating shaft by a clutch. Specifically, the first rotating shaft is connected to the second rotating shaft by engagement of the clutch. The first rotating shaft is disconnected from the second rotating shaft by disengagement of the clutch. In general, a generator is coupled to the first rotating shaft together with the gas turbine.

A stopping method for the C/C power generation plant of the clutch connection type is different from a stopping method for the C/C power generation plant of the rigid connection type. In general, when the C/C power generation plant of the clutch connection type is stopped, a rotation drop of the steam turbine is started after the clutch is disengaged. Thereafter, a rotation drop of the gas turbine is started. In this case, since the rotation drop of the gas turbine is faster than the rotation drop of the steam turbine, the rotating speed of the gas turbine soon catches up with the rotating speed of the steam turbine and the clutch is engaged again.

When the clutch is engaged, since the gas turbine and the steam turbine perform a rotation drop in a connected state, the gas turbine is prevented from performing the rotation drop fast and slowly performs the rotation drop. Therefore, a period until the rotating speed of the gas turbine decreases to the rotating speed for shutting off fuel of a combustor increases. Timing for shutting off the fuel of the combustor is delayed. As a result, the combustor keeps flames for a long period until the fuel is shut off. The fuel is wastefully consumed.

In one embodiment, a plant control apparatus is configured to control a power generation plant. The plant includes a combustor configured to burn fuel, a gas turbine configured to be driven by combustion gas supplied from the combustor, an exhaust heat recovery boiler configured to generate steam using heat of exhaust gas discharged from the gas turbine, a steam turbine configured to be driven by the steam supplied from the exhaust heat recovery boiler, a first shaft coupled to the gas turbine, a second shaft coupled to the steam turbine, and a clutch configured to connect the first shaft and the second shaft with engagement, when rotating speed of the first shaft catches up with rotating speed of the second shaft. The apparatus includes a first stop controller configured to, when stopping the power generation plant, stop the steam turbine to start to drop the rotating speed of the second shaft from rated rotating speed, and start to drop the rotating speed of the first shaft from the rated rotating speed while continuing combustion of the combustor after the stop of the steam turbine. The apparatus further includes a second stop controller configured to shut off the fuel of the combustor to stop the gas turbine when the rotating speed of the first shaft drops to first rotating speed, the second stop controller being configured to stop the gas turbine such that the rotating speed of the first shaft catches up with the rotating speed of the second shaft at second rotating speed that is equal to or lower than the first rotating speed and the clutch is engaged.

Embodiments will now be explained with reference to the accompanying drawings. In FIGS. 1 to 8, the same or similar components are denoted by the same reference numerals and signs, and redundant explanation of the components is omitted.

Comparative Example

A plant configuration and a plant stopping method in a comparative example are explained below. The plant configuration in this comparative example is equivalent to the clutch connection type. The plant stopping method in this comparative example is equivalent to a plant stopping method of the rigid connection type applied to the clutch connection type. In the rigid connection type, the gas turbine and the steam turbine are coupled to the same rotating shaft irrespective of the clutch.

(1) Plant Configuration in the Comparative Example

Figure 6:
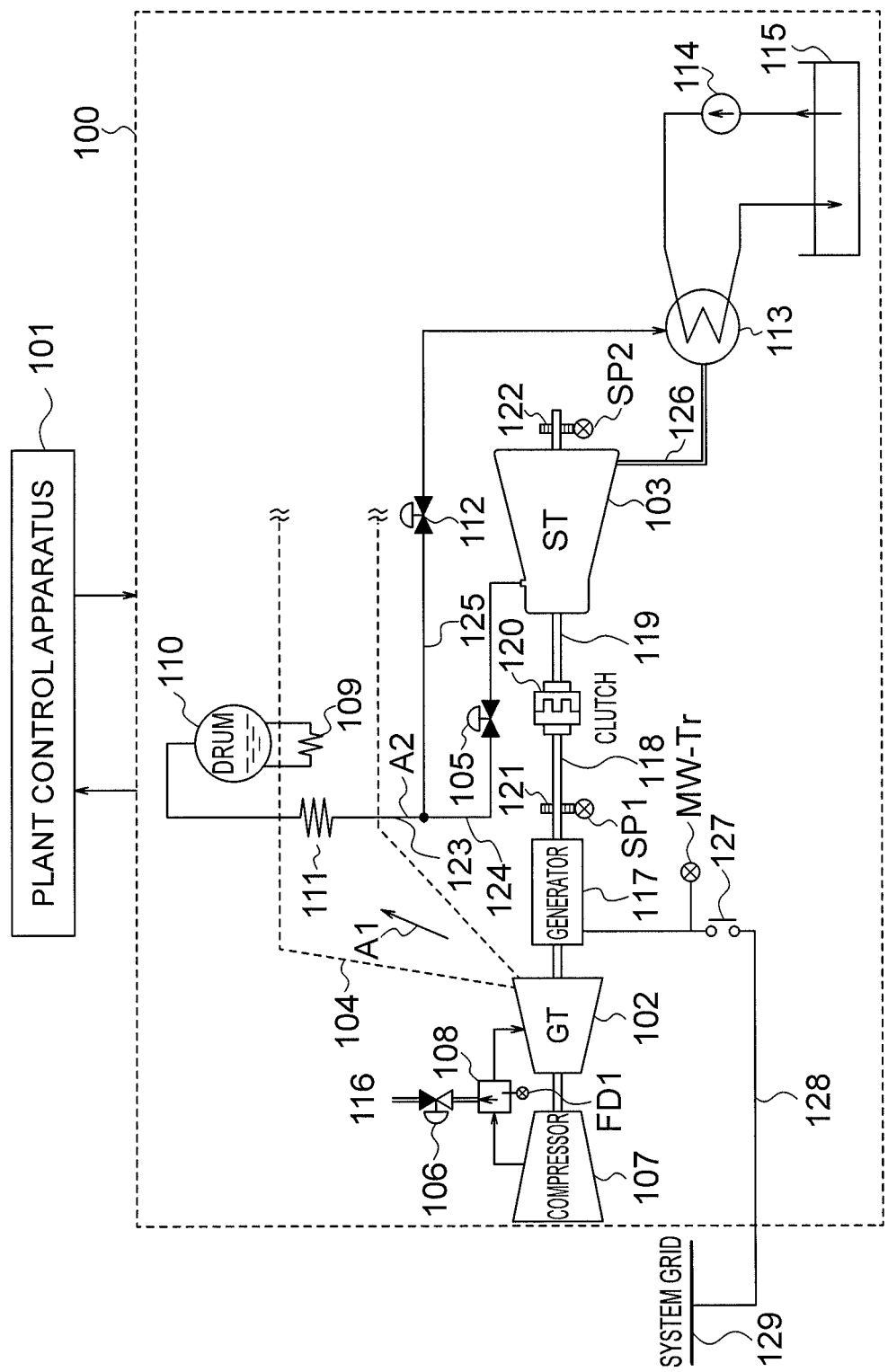
FIG. 6 is a schematic diagram showing the configuration of a power generation plant in a comparative example.

FIG. 6 is a schematic diagram showing the configuration of a power generation plant 100 in the comparative example.

The power generation plant 100 shown in FIG. 6 includes a plant control apparatus 101 that controls the operation of the power generation plant 100 and further includes a gas turbine (GT) 102, a steam turbine (ST) 103, an exhaust heat recovery boiler 104, an MCV valve (a regulating valve) 105, a fuel adjustment valve 106, a compressor 107, a combustor 108, an evaporator 109, a drum 110, a superheater 111, a turbine bypass adjustment valve 112, a condenser 113, a circulation water pump 114, an intake unit and a discharge unit for seawater 115, a supply unit for fuel 116, a generator 117, a first rotating shaft 118, a second rotating shaft 119, a clutch 120, a first detection gear 121, a second detection gear 122, a steam pipe 123, a main pipe 124, a bypass pipe 125, a turbine exhaust pipe 126, and a generator breaker 127. The generator breaker 127 is connected to a system grid 129 via a power transmission line 128. The power generation plant 100 shown in FIG. 6 further includes a flame detector FD1, a GT rotating speed detector SP1, an ST rotating speed detector SP2, and an MW transducer MW-Tr. The power generation plant 100 is "a one-axis combined cycle power generation plant of a clutch connection type" in which the gas turbine 102 and the steam turbine 103 are connected by engagement of the clutch 120.

First, the clutch 120 is explained. Actual structure of the clutch 120 is complicated. FIG. 6 schematically shows the actual structure of the clutch 120. The clutch 120 is a type generally called SSS clutch (Synchro-Self-Shifting). The first rotating shaft 118 coupled to the gas turbine 102 and the generator 117 and the second rotating shaft 119 coupled to the steam turbine 103 can be connected and the first rotating shaft 118 and the second rotating shaft 119 can be disconnected. In the former case, the clutch 120 is in an engaged state and, in the latter case, the clutch 120 is in a disengaged state. The engagement and the disengagement do no occur with intervention of the plant control apparatus 101. As indicated by the name of SSS clutch, when the rotating speed of the second rotating shaft 119 reaches the rotating speed of the first rotating shaft 118 (synchronization, Synchro), the clutch 120 is automatically engaged by the action of a centrifugal force and, when the rotating speed of the second rotating shaft 119 falls below the rotating speed of the first rotating shaft 118, the clutch 120 is automatically disengaged.

At a plant start time and at a plant stop time of the power generation plant 100, the clutch 120 is disengaged. An operation state in which the rotating speed of the first rotating shaft 118 and the rotating speed of the second rotating shaft 119 are different occurs. Therefore, the first detection gear 121 is provided in the first rotating shaft 118 and the GT rotating speed detector SP1 is set near the first detection gear 121. The GT rotating speed detector SP1 detects the rotating speed of the first rotating shaft 118 (the rotating speed of the gas turbine 102 and the generator 117) and outputs a detection result of the rotating speed to the plant control apparatus 101. The second detection gear 122 is provided in the second rotating shaft 119 and the ST rotating speed detector SP2 is set near the second detection gear 122. The ST rotating speed detector SP2 detects the rotating speed of the second rotating shaft 119 (the rotating speed of the steam turbine 103) and outputs a detection result of the rotating speed to the plant control apparatus 101.

When the power generation plant 100 ends the plant start and changes to a normal operation state, the clutch 120 is engaged and the rotating speeds detected by the GT rotating speed detector SP1 and the ST rotating speed detector SP2 are the same. In this case, since the gas turbine 102 and the steam turbine 103 are substantially connected to one rotating shaft, the generator 117 is driven by both of the gas turbine 102 and the steam turbine 103 and performs power generation.

The fuel adjustment valve 106 is provided on a fuel pipe. When the fuel adjustment valve 106 is opened, the fuel 116 is supplied from the fuel pipe to the combustor 108. The compressor 107 introduces air from an inlet thereof and supplies compressed air to the combustor 108. The combustor 108 burns the fuel 116 together with oxygen in the compressed air and generates a high-temperature high-pressure combustion gas. The flame detector FD1 detects flame in the combustor 108 and outputs a detection result of the flame to the plant control apparatus 101.

The gas turbine 102 is driven by the combustion gas supplied from the combustor 108 to rotate the first rotating shaft 118. The generator 117 is connected to the first rotating shaft 118 and performs power generation using the rotation of the first rotating shaft 118. Electric power generated by the generator 117 is sent to the power transmission line 128 in which the generator breaker 127 and the MW transducer MW-Tr are provided and transmitted to the system grid 129 via the power transmission line 128. At this time, the MW transducer MW-Tr measures electric power (output) of the generator 117 and transmits this measured electric power to the plant control apparatus 101.

Gas turbine exhaust gas A1 discharged from the gas turbine 102 is sent to the exhaust heat recovery boiler 104. The exhaust heat recovery boiler 104 generates main steam A2 using heat of the gas turbine exhaust gas A1. The evaporator 109, the drum 110, and the superheater 111 are provided in the exhaust heat recovery boiler 104 and configure a part of the exhaust heat recovery boiler 104. Water in the drum 110 is sent to the evaporator 109 and heated by the gas turbine exhaust gas A1 in the evaporator 109 to be saturated steam. The saturated steam is sent to the superheater 111 and superheated by the gas turbine exhaust gas A1 in the superheater 111 to be superheated steam. The superheated steam generated by the exhaust heat recovery boiler 104 is discharged to the steam pipe 123 as the main steam A2.

The steam pipe 123 is divided into the main pipe 124 and the bypass pipe 125. The main pipe 124 is connected to the steam turbine 103. The bypass pipe 125 is connected to the condenser 113. The MCV valve 105 is provided in the main pipe 124. The turbine bypass adjustment valve 112 is provided in the bypass pipe 125.

When the MCV valve 105 is opened, the main steam A2 from the main pipe 124 is supplied to the steam turbine 103. The steam turbine 103 is driven by the main steam A2 to rotate the second rotating shaft 119. In a state in which the clutch 120 is engaged, since the steam turbine 103 rotates one rotating shaft in conjunction with the gas turbine 102, the generator 117 is driven by both of the gas turbine 102 and the steam turbine 103. The main steam A2, which has driven the steam turbine 103, is discharged from the steam turbine 103 to be exhaust steam and is sent to the condenser 113 through the turbine exhaust pipe 126.

On the other hand, when the turbine bypass adjustment valve 112 is opened, the main steam A2 from the bypass pipe 125 is sent to the condenser 113 bypassing the steam turbine 103. The main steam A2 sent to the condenser 113 and the exhaust steam described above are cooled by the seawater 115 supplied by the circulation water pump 114 to condense.

The plant control apparatus 101 controls various operations of the power generation plant 100 such as a start and a stop of the power generation plant 100. For example, the plant control apparatus 101 controls the fuel adjustment valve 106, the MCV valve 105, and the turbine bypass adjustment valve 112 to perform operation control for the gas turbine 102, the steam turbine 103, and the exhaust heat recovery boiler 104. A stopping method for the power generation plant 100 in this comparative example is explained below.

(2) Plant Stopping Method in the Comparative Example

Figure 7:
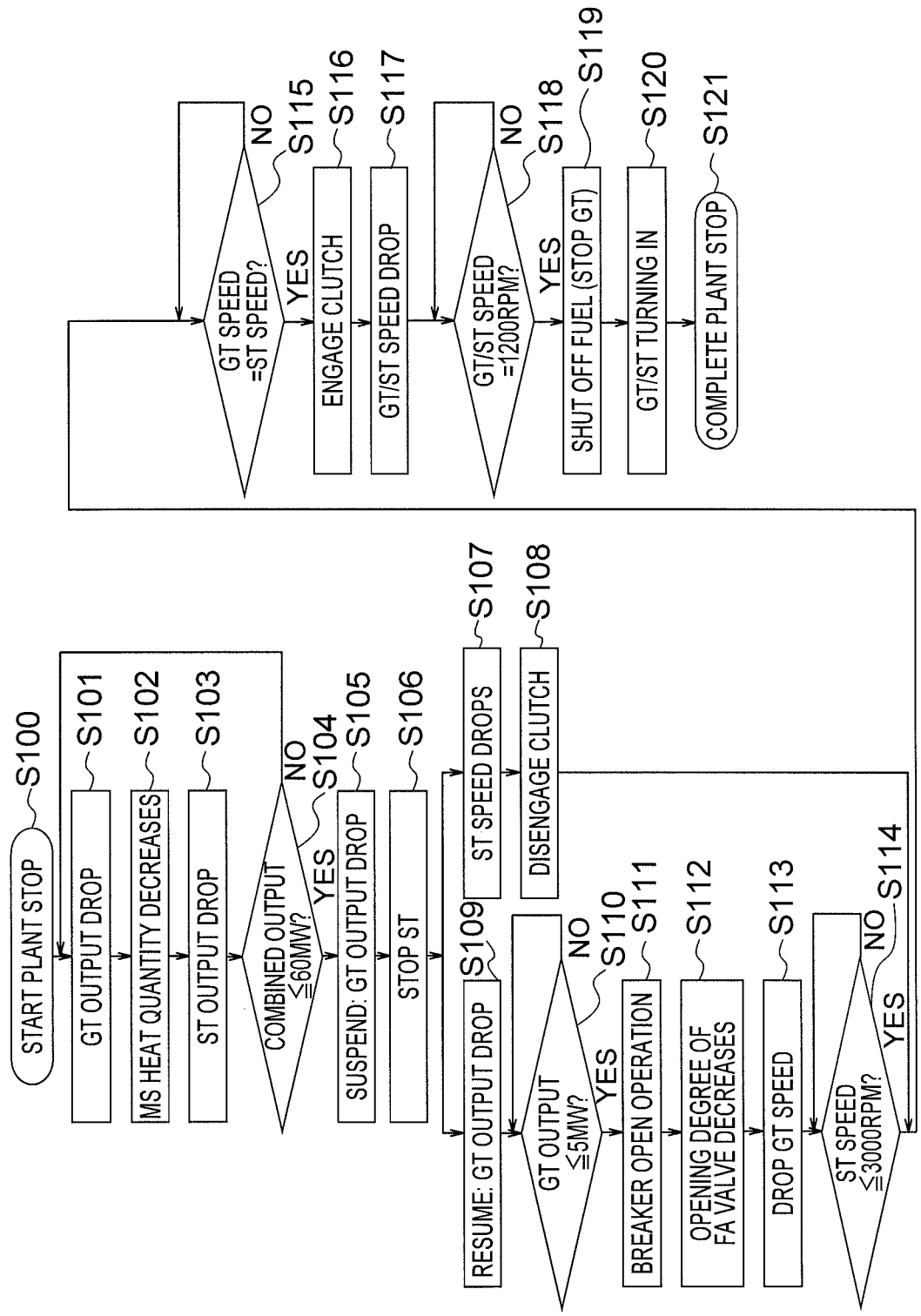
FIG. 7 is a flowchart showing a plant stopping method in the comparative example.

FIG. 7 is a flowchart showing a plant stopping method in the comparative example.

Software stored on the inside of the plant control apparatus 101 realizes this flowchart. Specific numerical values used in the following explanation are examples described for convenience of explanation and easy understanding. Reference to a trend graph of FIG. 8 explained below together with the flowchart of FIG. 7 helps easier understanding.

Before a stop of the power generation plant 100 (a plant stop) is started, the power generation plant 100 is in normal operation and the clutch 120 is engaged. During the normal operation, the gas turbine 102 is operated to generate power at a rated output of 200 MW. The steam turbine 103 is also operated to generate power at a rated output of 100 MW. Both the turbines are operated at a total output (hereinafter referred to as combined output) of 300 MW.

When the plant stop is started (step S100), an opening degree of the fuel adjustment valve 106 is reduced at a fixed rate to perform gas turbine (GT) output drop (step S101). The combined output gradually decreases from 300 MW. What is considered important in the plant stop is to perform stop operation such that a burden on the gas turbine 102 and the steam turbine 103 becomes as small as possible. When the opening degree of the fuel adjustment valve 106 is reduced at the fixed rate as in step S101, an amount of the fuel 116 gradually decreases. Consequently, for example, the temperature of the gas turbine exhaust gas A1 also gradually falls. Thermal stress generated when the gas turbine 102 is stopped later is also reduced. When thermal energy retained by the gas turbine exhaust gas A1 decreases, the heat quantity (temperature, pressure, and a flow rate) of the main steam A2 also decreases. Therefore, steam turbine (ST) output drop is performed (step S102). Power generation of the steam turbine 103 gradually decreases from 100 MW.

When the combined output detected by the MW transducer MW-Tr drops to 60 MW (YES in step S104), the gas turbine output drop is suspended (step S105). In addition, the reducing operation for the opening degree of the fuel adjustment valve 106 is also suspended. The gas turbine 102 is retained in a fixed output state. At this time, details of the combined output of 60 MW are as follows. That is, the gas turbine 102 is retained at 25 MW, the steam turbine 103 is retained at 35 MW, and the gas turbine 102 and the steam turbine 103 are performing power generation at 60 MW in total.

A general characteristic of the combined cycle power generation plant shows a heat balance in which a steam turbine output is larger than a gas turbine output in a low output state. This is because, even at a low output, a considerable amount of the fuel 116 is supplied to work for driving the compressor 107 in addition to work of power generation in the gas turbine 102. Accordingly, since the gas turbine exhaust gas A2 having a high heat quantity, the output of the steam turbine 103 is larger.

While the gas turbine 102 is retained in a fixed output state of 25 MW, the stopping operation for the steam turbine 103 is performed (step S106). As a result, the power generation of the steam turbine 103 decreases from 35 MW. In this stopping operation, the opening degree of the MCV valve 105 is reduced at a fixed rate to gradually drop the output of the steam turbine 103. Finally, the MCV valve 105 is closed. The stop of the steam turbine 103 is completed when the MCV valve 105 is fully closed. The power generation of the steam turbine 103 decreases to zero. Therefore, the combined output drops to only the gas turbine output of 25 MW. At this time, as the MCV valve 105 is closed, surplus main steam A2 is fed into the condenser 113 and allowed to escape through the turbine bypass valve 112. The drum 110 is also operated to retain pressure constant.

The gas turbine output is retained at 25 MW in step S105 before step S106. The retained output of 25 MW needs to be selected from the following viewpoint. That is, i) if the gas turbine output is dropped to 25 MW or less, the temperature of the gas turbine exhaust gas A1 becomes excessively low. As a result, a trouble occurs in the operation of the steam turbine 103: for example, cold main steam A2 flows into the steam turbine 103 and thermal stress occurs. ii) Conversely, when the steam turbine 103 is stopped while maintaining the gas turbine output of 25 MW or more, the main steam A2 still retains the high heat quantity. The main steam A2 flowing into the condenser 113 through the turbine bypass valve 112 is a burden for the condenser 113. Specifically, a problem occurs in that, because of this high heat quantity, a seawater temperature difference in an inlet and an outlet of the condenser 113 is increased to temperature (in general, 7° C.) allowed in environment preservation. The retained output of 25 MW needs to be selected as tradeoff between i) and ii).

The steam turbine 103 is a turbine adapted to 60 HZ. Rated rotating speed of the steam turbine 103 is 3600 RPM (Revolution Per Minute). When the stop of the steam turbine 103 is completed (the MCV valve 105 is fully closed), torque for driving the steam turbine 103 disappears. The rotating speed of the steam turbine 103 (hereinafter referred to as ST rotating speed as well) starts to drop from 3600 RPM (step S107). At an instance when the rotating speed of the steam turbine 103 becomes slightly lower than the rotating speed of the gas turbine 102 (hereinafter referred to as GT rotating speed as well), the clutch 120 is automatically disengaged (step S108). Thereafter, the ST rotating speed further drops. However, the ST rotating speed slowly drops at a sluggish rate according to large inertia of the steam turbine 103.

After the stop of the steam turbine 103 is completed, the opening degree of the fuel adjustment valve 106 is reduced at a fixed rate and the gas turbine output drop is resumed (step S109). The power generation of the steam turbine 103 gradually decreases from 25 MW. When the gas turbine output detected by the MW transducer MW-Tr drops to 5 MW (YES in step S110), the generator breaker 127 is opened and brought into the breaker open operation (step S111). When the generator breaker 127 is brought into the breaker open operation, power generation MW decreases to zero. The combined output also decreases to zero. The plant stopping method in this comparative example is a method corresponding to a stopping method for the power generation plant of the rigid connection type. Therefore, immediately after the stop of the steam turbine 103 is completed, the gas turbine output drop is resumed. This point is pointed out as a procedure different from a procedure in a first embodiment explained below. The rotating speed of the gas turbine 102 before being brought into the breaker open operation is the rated rotating speed of 3600 RPM. After brought into the breaker open operation, the rotating speed of the gas turbine 102 starts to drop to 3600 RPM or less. However, the considerable amount of the fuel 116 is still supplied to the gas turbine 102 in order to drive the compressor 107. The gas turbine 102, to which a large amount of the fuel 116 is supplied, cannot be suddenly stopped here. Therefore, the opening degree of the fuel adjustment valve 106 is further reduced (step S112) and the rotating speed of the gas turbine 102 is reduced (step S113). Since the gas turbine 102 during a GT rotation drop also drives the compressor 107, this compressor has, so to speak, action of a brake. The GT rotating speed quickly drops at a high-speed rate.

The GT rotating speed quickly dropping at the high-speed rate soon catches up with the ST rotating speed dropping at the sluggish rate. Specifically, when the GT rotating speed drops to 3000 RPM (YES in step S114), the rotating speeds of both the turbines coincide (YES in step S115). At this time, the clutch 120 is engaged again (step S116). The gas turbine 102 and the steam turbine 103 in the connected state perform a rotation drop together from 3000 PM (step S117). The rotating speed in this connected state is hereinafter referred to as "GT/ST rotating speed". The GT/ST rotating speed drops at an intermediate value of a drop rate of the rotating speeds of both the turbines to that point, that is, a drop rate lower than the GT rotating speed and a drop rate higher than the ST rotating speed.

When the GT/ST rotating speed detected by the GT rotating speed detector SP1 drops to 1200 RPM (YES in step S118), the fuel adjustment valve 106 has a sufficiently low opening degree and the fuel 116 also decreases in an amount. Therefore, the gas turbine 102 is stopped (step S119) and the fuel adjustment valve 106 is closed. Consequently, the fuel 116 is shut off to be zero. The GT/ST rotating speed further drops. Finally, the gas turbine 102 and the steam turbine 103 start a turning operation at extremely low rotation (step S120). The operation of the plant stop is completed (step S121).

Figure 8:
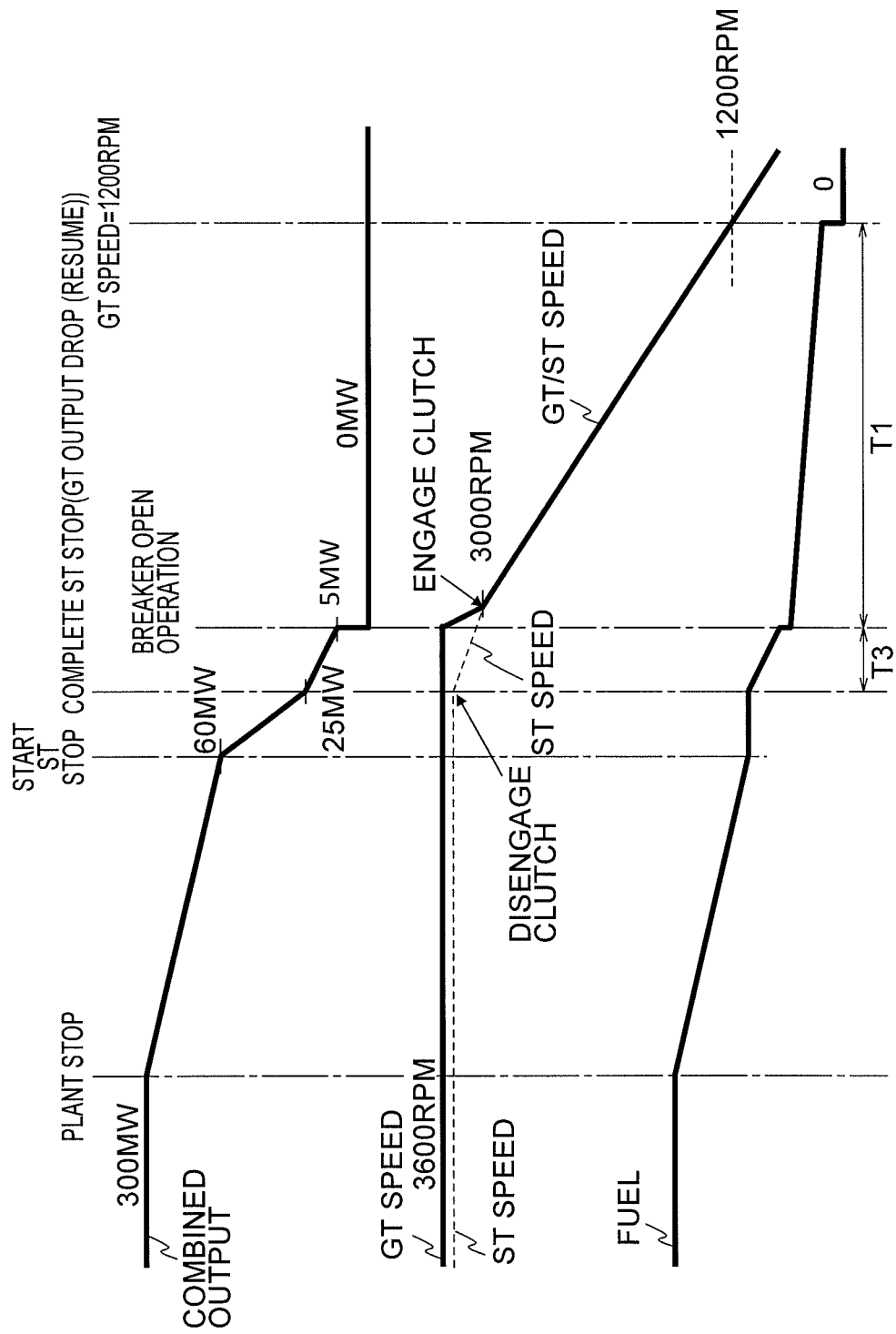
FIG. 8 is a trend graph for explaining the plant stopping method in the comparative example.

FIG. 8 is a trend graph for explaining the plant stopping method in the comparative example and is prepared to more directly visualize the plant stopping method in this comparative example.

This is briefly explained, although the explanation overlaps the above explanation. Before the plant stop is started, the combined output is 300 MW. When the plant stop is started, the fuel 116 is reduced at a predetermined rate. The combined output gradually decreases from 300 MW.

When the combined output drops to 60 MW (the gas turbine output drops to 25 MW), the reduction of the fuel 116 is once suspended. The stop of the steam turbine (ST) 103 is started. When the stop of the steam turbine 103 is completed, the clutch 120 is disengaged and the ST rotating speed starts to drop from 3600 RPM. At the same time, the gas turbine output drop is resumed. The gas turbine output gradually drops from 25 MW and is brought into the breaker open operation when dropping to 5 MW. A sign T3 represents a time until the combined output drops from 25 MW to 5 MW.

The GT rotating speed after brought into the breaker open operation drops at a high-speed rate from 3600 RPM and catches up with the ST rotating speed when dropping to 3000 RPM. The rotating speeds of both the turbines coincide. At this time, the clutch 120 is engaged again.

The GT rotating speed (the GT/ST rotating speed) after the engagement of the clutch 120 drops at a drop rate lower than the GT rotating speed to that point. As a result, a long time (T1) is required until the GT rotating speed drops from 3600 RPM to 1200 RPM. When the GT rotating speed drops to 1200 RPM, the fuel 116 is shut off and the gas turbine 102 is stopped. Thereafter, in a state in which the clutch 120 is engaged, both the turbines slowly perform rotation drop and start the turning operation.

(3) Problem 1 of the Comparative Example

As plainly indicated by FIG. 8, the plant stopping method in the comparative example is a method of reengaging the clutch when the GT rotating speed is still high rotating speed of 3000 RPM after brought into the breaker open operation and is a method of reengaging the clutch while the fuel is still supplied. As a result, the GT rotating speed after the clutch engagement is affected by large inertia of the steam turbine and has to drop at a sluggish rate. A long time of T1 is required until the GT rotating speed reaches 1200 RPM. This causes a problem in that time (T1) in which the fuel is wastefully consumed without contributing to power generation continues long.

(4) Problem 2 of the Comparative Example

When the clutch engagement is performed, the first rotating shaft 118 and the second rotating shaft 119 are connected while physically "shaking" each other. Therefore, a shock to the gas turbine and the generator is inevitable. Specifically, that is observed as an increase in bearing vibration of the gas turbine and the generator. In particular, vibration occurrence in a generator bearing close to the clutch is conspicuous. This vibration occurrence is an event that occurs not only in a stopping process of the power generation plant but also in a starting process of the power generation plant. However, as opposed to the plant start in which the clutch engagement is always performed at the rated rotating speed (3600 RPM), in the plant stop, the clutch engagement is likely to be performed at dangerous speed explained below. In that case, the problems is more serious. A relation between the dangerous speed and the clutch engagement is explained below.

In general, a rotating shaft has dangerous speed (dangerous rotating speed) at which large vibration due to resonance occurs. The rotating shafts of the turbine and the generator of the power generation plant are not an exception. The dangerous speed is speed (rotating speed) at which resonance due to natural vibration of the rotating shafts occurs. The dangerous speed depends on a natural frequency (a resonance frequency) of the rotating shafts. Accordingly, a numerical value of the dangerous speed is different for each of the rotating shafts of the power generation plant. However, the dangerous speed is often in a rotating speed region of appropriately 70% to 80% of the rated rotating speed. This is because, when the rotating shafts are designed, the rated rotating speed is set to approximately 1.2 times to 1.3 times of the dangerous speed.

A case in which a rotating shaft (a connected body of the first rotating shaft 118 and the second rotating shaft 119) in the comparative example has the dangerous speed at 80% of the rated rotating speed is explained below. This 80% rotating speed is 2880 RPM (3600×0.8). 3000 RPM, which is the rotating speed at which the clutch 120 is engaged, is sufficiently near 2880 RPM. That is, the rotating speed at which the clutch 120 in the comparative example is engaged is considered to be within the dangerous speed region. In other words, in the plant stopping method in the comparative example, timing when the dangerous speed involving large vibration occurrence occurs and timing of the clutch engagement overlaps and worsens the bearing vibration. Therefore, it is likely that equipment is destroyed in the worst case. In order to prevent this equipment destruction, it is conceivable to take a protection measure by an emergency gas turbine stop when detecting that the bearing vibration exceeds a predetermined threshold. However, this is not a stable plant stopping method.

First Embodiment (1) Plant Configuration in a First Embodiment

FIG. 1 is a schematic diagram showing the configuration of a power generation plant 100a in a first embodiment.

The power generation plant 100a shown in FIG. 1 includes a plant control apparatus 101a that controls the operation of the power generation plant 100a. The power generation plant 100a shown in FIG. 1 further includes the gas turbine (GT) 102, the steam turbine (ST) 103, the exhaust heat recovery boiler 104, the MCV valve (the regulating valve) 105, the fuel adjustment valve 106, the compressor 107, the combustor 108, the evaporator 109, the drum 110, the superheater 111, the turbine bypass adjustment valve 112, the condenser 113, the circulation water pump 114, the intake unit and the discharge unit for seawater 115, the supply unit for fuel 116, the generator 117, the first rotating shaft 118, the second rotating shaft 119, the clutch 120, the first detection gear 121, the second detection gear 122, the steam pipe 123, the main pipe 124, the bypass pipe 125, the turbine exhaust pipe 126, and the generator breaker 127, which have the same functions as those of the power generation plant 100 shown in FIG. 6. Like the generator breaker 127 shown in FIG. 6, the generator breaker 127 shown in FIG. 1 is connected to the system grid 129 via the power transmission line 128. The power generation plant 100a shown in FIG. 1 further includes the flame detector FD1, the GT rotating speed detector SP1, the ST rotating speed detector SP2, and the MW transducer MW-Tr, which have the same functions as those of the power generation plant 100 shown in FIG. 6. The power generation plant 100a is "a one-axis combined cycle power generation plant of a clutch connection type" in which the gas turbine 102 and the steam turbine 103 are connected by engagement of the clutch 120.

The plant control apparatus 101a in this embodiment has the same functions as the functions of the plant control apparatus 101 in the comparative example but also has functions different from the functions of the plant control apparatus 101 in the comparative example. On the other hand, functions of the other components of the power generation plant 100a shown in FIG. 1 are the same as the functions of the corresponding components of the power generation plant 100 shown in FIG. 6.

(2) Plant Stopping Method in the First Embodiment

Figure 2:
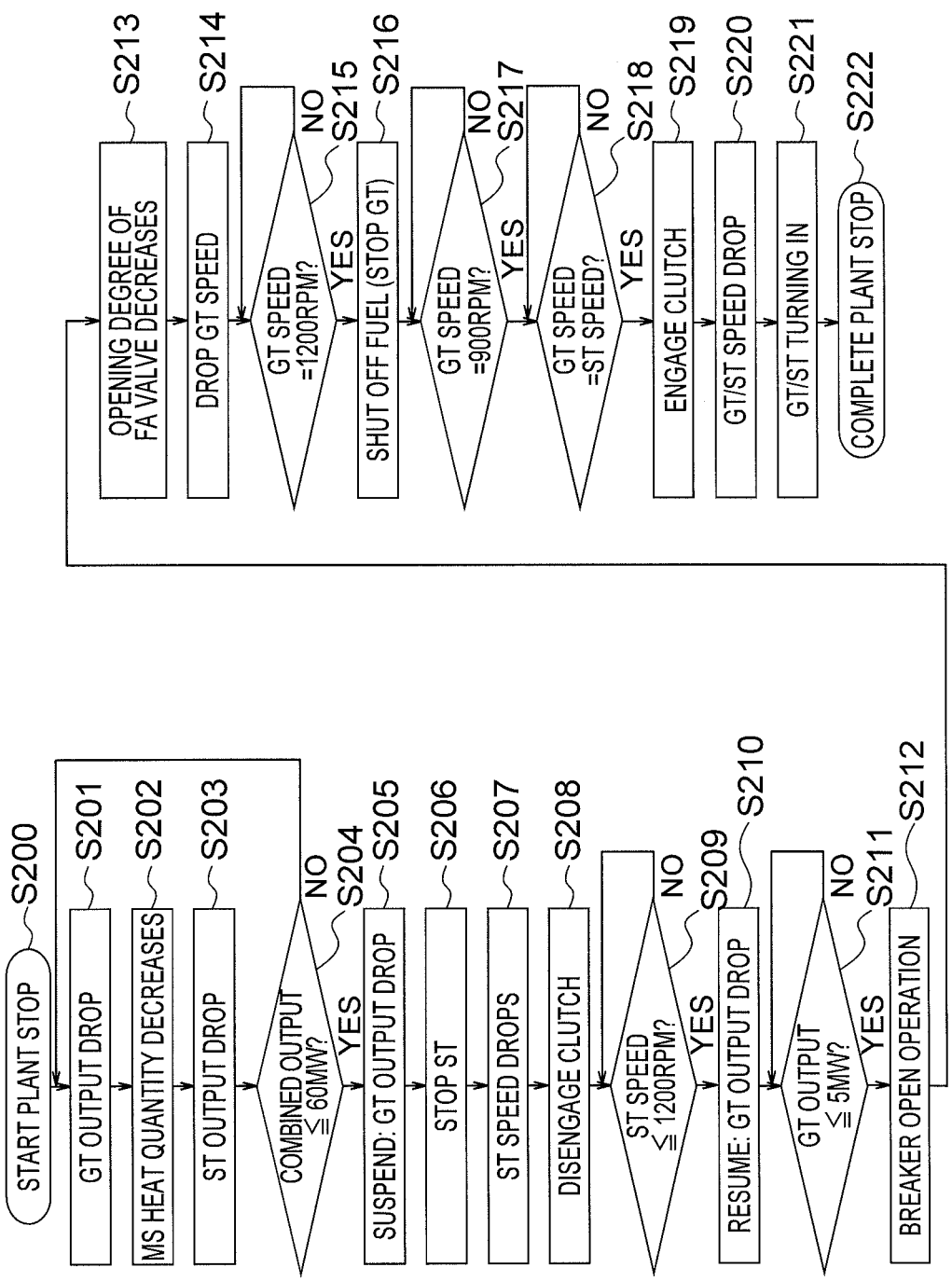
FIG. 2 is a flowchart showing a plant stopping method in the first embodiment.

FIG. 2 is a flowchart showing a plant stopping method in the first embodiment.

Software stored on the inside of the plant control apparatus 101a realizes this flowchart. Specific numerical values used in the following explanation are examples described for convenience of explanation and easy understanding. Reference to a trend graph of FIG. 3 explained below together with the flowchart of FIG. 2 helps easier understanding.

Before a stop of the power generation plant 100a (a plant stop) is started, the power generation plant 100a is in normal operation and the clutch 120 is engaged. During the normal operation, the gas turbine 102 is operated to generate power at a rated output of 200 MW. The steam turbine 103 is also operated to generate power at a rated output of 100 MW. Both the turbines are operated at a total output (hereinafter referred to as combined output) of 300 MW.

When the plant stop is started (step S200), an opening degree of the fuel adjustment valve 106 is reduced at a fixed rate to perform gas turbine (CT) output drop (step S201). The combined output gradually decreases from 300 MW. What is considered important in the plant stop is to perform stop operation such that a burden on the gas turbine 102 and the steam turbine 103 becomes as small as possible. When the opening degree of the fuel adjustment valve 106 is reduced at the fixed rate as in step S201, an amount of the fuel 116 gradually decreases. Consequently, for example, the temperature of the gas turbine exhaust gas A1 also gradually falls. Thermal stress generated when the gas turbine 102 is stopped later is also reduced. When thermal energy retained by the gas turbine exhaust gas A1 decreases, the heat quantity (temperature, pressure, and a flow rate) of the main steam A2 also decreases. Therefore, steam turbine (ST) output drop is performed (step S202). Power generation of the steam turbine 103 gradually decreases from 100 MW.

When the combined output detected by the MW transducer MW-Tr drops to 60 MW (YES in step S204), the gas turbine output drop is suspended (step S205). In addition, the reducing operation for the opening degree of the fuel adjustment valve 106 is also suspended. The gas turbine 102 is retained in a fixed output state. At this time, details of the combined output of 60 MW are as follows. That is, the gas turbine 102 is retained at 25 MW, the steam turbine 103 is retained at 35 MW, and the gas turbine 102 and the steam turbine 103 are performing power generation at 60 MW in total.

While the gas turbine 102 is retained in a fixed output state of 25 MW, the stopping operation for the steam turbine 103 is performed (step S206). As a result, the power generation of the steam turbine 103 decreases from 35 MW. In this stopping operation, the opening degree of the MCV valve 105 is reduced at a fixed rate to gradually drop the output of the steam turbine 103. Finally, the MCV valve 105 is fully closed. The stop of the steam turbine 103 is completed when the MCV valve 105 is fully closed. The power generation of the steam turbine 103 decreases to zero. Therefore, the combined output drops to only the gas turbine output of 25 MW. At this time, as the MCV valve 105 is closed, surplus main steam A2 is fed into the condenser 113 and allowed to escape through the turbine bypass valve 112. The drum 110 is also operated to retain pressure constant.

A reason why the gas turbine output is retained at 25 MW in step S205 before step S206 is the same as the reason in the case of step S105 in the comparative example. Explanation of the reason is omitted.

The steam turbine 103 is a turbine adapted to 60 HZ. Rated rotating speed of the steam turbine 103 is 3600 RPM. When the stop of the steam turbine 103 is completed (the MCV valve 105 is fully closed), torque for driving the steam turbine 103 disappears. The rotating speed of the steam turbine 103 (ST rotating speed) starts to drop from 3600 RPM (step S207). At an instance when the rotating speed of the steam turbine 103 becomes slightly lower than the rotating speed of the gas turbine 102 (GT rotating speed), the clutch 120 is automatically disengaged (step S208). Thereafter, the ST rotating speed further drops. However, the ST rotating speed slowly drops at a sluggish rate according to large inertia of the steam turbine 103.

The plant stopping procedure explained above is the same as the plant stopping procedure in the comparative example. The plant stopping procedure in this embodiment is different from the plant stopping procedure in the comparative example in the following points.

Even while the ST rotating speed drops from 3600 RPM, the output of the gas turbine 102 is retained at 25 MW. When the ST rotating speed detected by the ST rotating speed detector SP2 drops to 1200 RPM (YES in step S209), the gas turbine output drop is resumed (step S210). When the gas turbine output drop is resumed, the power generation of the gas turbine gradually decreases from 25 MW. When the gas turbine output detected by the MW transducer MW-Tr drops to 5 MW (YES in step S211), the generator breaker 127 is opened and brought into the breaker open operation (step S212). When the generator breaker 127 is brought into the breaker open operation, the power generation MW decreases to zero. The combined output also decreases to zero.

The GT rotating speed before brought into the breaker open operation is 3600 RPM but the GT rotating speed after brought into the breaker open operation starts to drop to 3600 RPM or less. However, at this time, a considerable amount of the fuel 116 is still supplied to the gas turbine 102 in order to drive the compressor 107 and the combustor 108. The opening degree of the fuel adjustment valve 106 is further reduced (step S213) and the GT rotating speed is further dropped (step S214). Since the gas turbine 102 during the GT rotation drop also drives the compressor 107, the compressor 107 has, so to speak, action of a brake. The GT rotating speed quickly drops to 1200 RPM at a relatively high-speed rate. At this time, since the clutch 120 is disengaged, the rotation of the gas turbine 102 independently quickly drops to 1200 RPM without being affected by the large inertia of the steam turbine 103. This is different from the comparative example. A function of the plant control apparatus 101a performing the processing in steps S206 to S214 is an example of a first stop controller. The rotating speed "1200 RPM" in step S209 is an example of third rotating speed.

When the GT rotating speed detected by the GT rotating speed detector SP1 drops to 1200 RPM (YES in step S215), the fuel adjustment valve 106 has a sufficiently low opening degree and the fuel 116 also decreases in an amount. Therefore, the gas turbine 102 is stopped (step S216). At this time, the fuel adjustment valve 106 is closed and the fuel 116 is shut off to be zero. The gas turbine 102 is stopped after the GT rotating speed drops to 1200 RPM in this way because, as explained above, the amount of the fuel 116 is reduced to be sufficiently small and the exhaust gas temperature of the gas turbine 102 is also set to low temperature to prevent a large burden from being applied to the gas turbine 102 in terms of thermal stress and the like. In this embodiment, combustion of the combustor 108 is continued to before step S216. In step S216, the fuel 116 of the combustor 108 is shut off. The rotating speed "1200 RPM" in step S215 is an example of first rotating speed.

Even after the gas turbine 102 is stopped, the GT rotating speed drops at a high-speed rate. When the GT rotating speed drops to 900 RPM (YES in step S217), the GT rotating speed catches up with the ST rotating speed that drops at a sluggish rate. The rotating speeds of both the turbines coincide (YES in step S218). At this time, the clutch 120 is engaged again (step S219). A function of the plant control apparatus 101a performing the processing in steps 215 to S219 is an example of a second stop controller. The rotating speed "900 RPM" in step S217 is an example of second rotating speed.

The gas turbine 102 and the steam turbine 103 in the connected state perform a rotation drop together from 900 RPM (step S220). The rotating speed in this connected state is referred to as "GT/ST rotating speed" as explained above. A drop rate of the GT/ST rotating speed is an intermediate rate of a drop rate of the GT rotating speed and a drop rate of the ST rotating speed to that point. The GT/ST rotating speed further drops. Finally, the gas turbine 102 and the steam turbine 103 start a turning operation at extremely low rotation (step S221). The operation of the plant stop is completed (step S222). The GT/ST rotating speed drops from 900 RPM at a sluggish rate. However, since the gas turbine 102 is already in the stopped state, a serious problem does not occur even if the rotation drop delays in this operation region.

Figure 3:
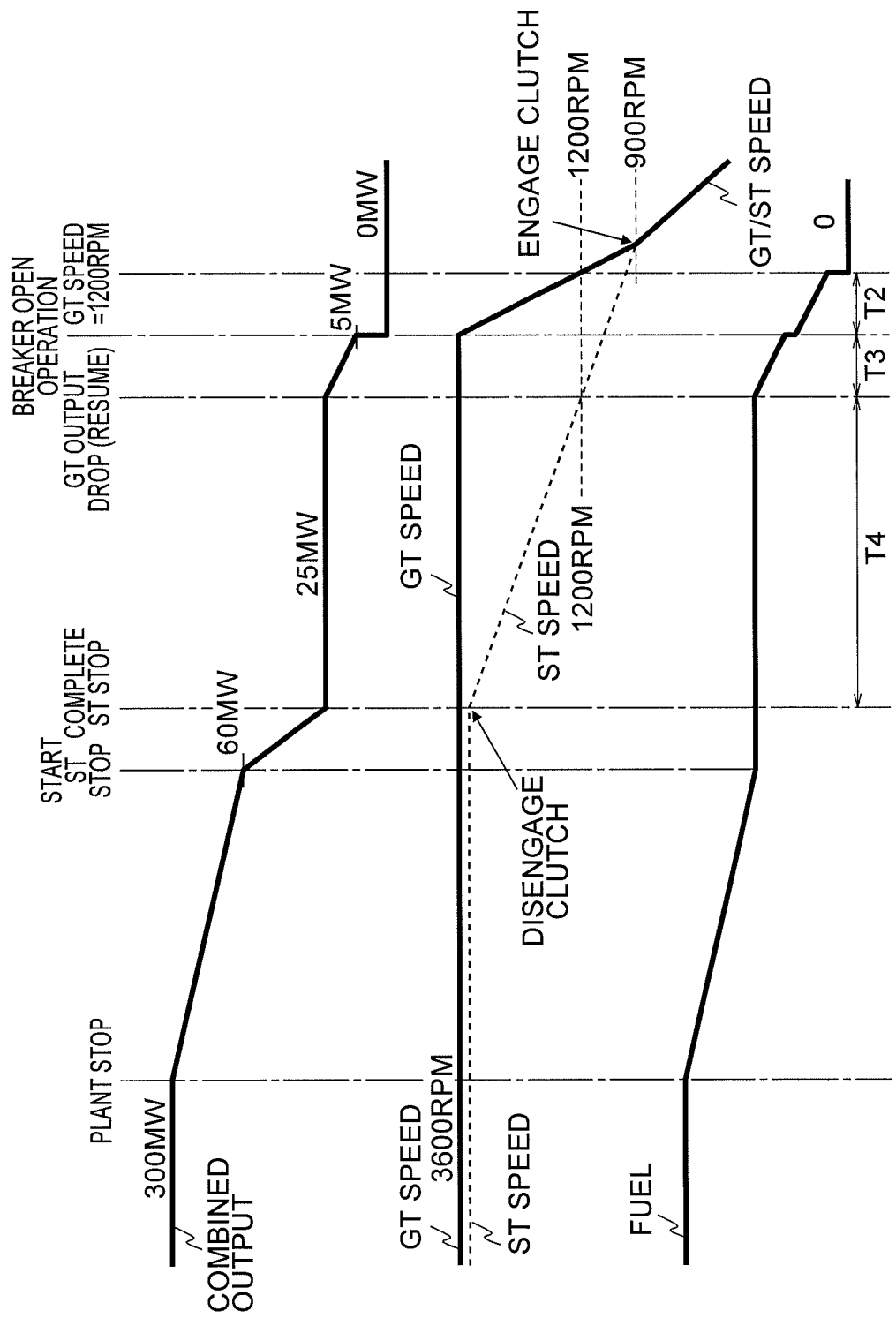
FIG. 3 is a trend graph for explaining the plant stopping method in the first embodiment.

FIG. 3 is a trend graph for explaining the plant stopping method in the first embodiment and is prepared to more directly visualize the plant stopping method in this embodiment.

This is briefly explained, although the explanation overlaps the above explanation. Before the plant stop is started, the combined output is 300 MW. When the plant stop is started, the fuel 116 is reduced at a predetermined rate. The combined output gradually decreases from 300 MW.

When the combined output drops to 60 MW (the gas turbine output drops to 25 MW), the reduction of the fuel 116 is once suspended. The stop of the steam turbine (ST) 103 is started. When the stop of the steam turbine 103 is completed, the clutch 120 is disengaged and the ST rotating speed starts to drop from 3600 RPM. At this time, the ST rotating speed drops at a sluggish rate. A time (T4) is required until the ST rotating speed drops from 3600 RPM to 1200 RPM.

When the ST rotating speed drops to 1200 RPM (the third rotating speed), the gas turbine output drop is resumed. When the gas turbine output drop is resumed, the gas turbine output gradually drops from 25 MW and is brought into the breaker open operation when dropping to 5 MW. A time (T3) is required until the gas turbine output (the combined output) drops from 25 MW to 5 MW.

The GT rotating speed after brought into the breaker open operation drops from 3600 RPM at a high-speed rate. When the GT rotating speed drops to 1200 RPM, the fuel 116 is shut off and the gas turbine 102 is stopped. At this time, only a relatively short time (T2) is required until the GT rotating speed drops from 3600 RPM to 1200 RPM (the first rotating speed). This is a difference from the comparative example.

Even after the gas turbine 102 is stopped, the GT rotating speed continues the drop. When the GT rotating speed drops to 900 RPM (the second rotating speed), the GT rotating speed catches up with the ST rotating speed, the rotating speeds of both the turbines coincide, and the clutch 120 is engaged again at this time. Thereafter, in a state in which the clutch 120 is engaged, both the turbines slowly perform a rotation drop and start the turning operation.

(3) Effect 1 of the First Embodiment

When FIG. 3 and FIG. 8 are compared, it is evident that the time (T2) required for the drop from 3600 RP to 1200 RPM in this embodiment is an extremely short time compare with the time (T1) in the comparative example. As a result, "the problem in that the fuel is wastefully supplied for a long time" involved in the plant stopping method in the comparative example is solved or greatly reduced in this embodiment. In order to realize this, in this embodiment, the gas turbine output is started to be dropped again from 25

MW after the ST rotating speed drops to 1200 RPM. Accordingly, when the GT rotating speed in this embodiment drops to 1200 RPM, the ST rotating speed always drops to 1200 RPM or less. That is, in this embodiment, the rotating speeds of both the turbines coincide and the clutch is engaged always at a rotating speed equal to or lower than 1200 RPM (the rotating speed for shutting off the fuel).

Further, in this embodiment, the clutch is engaged in a state in which the fuel is shut off. As explained above, when the clutch is engaged, both the rotating shafts perform a behavior of "shaking" each other and, as a result, the bearing vibration of the gas turbine and the generator increases. Whereas this shaking is performed during the combustion of the gas turbine in the comparative example, the shaking is performed after the fuel is shut off (the gas turbine is already stopped) in this embodiment. Accordingly, according to this embodiment, it is possible to realize the plant stopping method that is safe and low risk compared with the comparative example.

Further, in this embodiment, while the GT rotating speed drops from 3600 RPM to 1200 RPM, the clutch is always disengaged and the gas turbine (and the generator) independently performs the rotation drop. Consequently, the gas turbine can independently quickly perform the rotation drop from 3600 RPM to 1200 RPM without being affected by the large inertia of the steam turbine and is capable of quickly shutting off the fuel. Such a plant stopping method is enabled because the rotation drop of the gas turbine is started after the ST rotating speed drops to 1200 RPM, which is the rotating speed for shutting off the fuel of the gas turbine.

(4) Effect 2 of the First Embodiment

In the first embodiment, since the clutch 120 is engaged at 900 RPM far apart from the dangerous speed region near 2880 RPM, the problem in that the bearing vibration of the gas turbine and the generator increases while being promoted by the clutch engagement in the comparative example is solved. That is, according to this embodiment, the plant stopping method in which the clutch engagement is performed avoiding the dangerous speed region is realized.

As explained above, the dangerous speed is the speed (the rotating speed) at which resonance due to natural vibrations of the rotating shafts occurs. The dangerous speed depends on natural frequencies (resonance frequencies) of the rotating shafts. Accordingly, a numerical value of the dangerous speed is different for each of the rotating shafts of the power generation plant. However, the dangerous speed is often in a rotating speed region of appropriately 70% to 80% of the rated rotating speed. Incidentally, the dangerous speed also changes between the comparative example (the dangerous speed of the connected body of the first rotating shaft 118 and the second rotating shaft 119) and the first embodiment (the dangerous speed of the first rotating shaft 118 alone). However, even when fluctuation in a numerical value of the dangerous speed is taken into account, the plant stopping method in the first embodiment is considered to have an effect of performing the clutch engagement avoiding the dangerous speed region. This is because the rotating speed for shutting off the fuel is markedly low with respect to the dangerous speed. In other words, although the dangerous speed changes between the comparative example and the first embodiment, the dangerous speed in the first embodiment is a value (for example, 2800 RPM) close to 2880 RPM. This value is far apart from 900 RPM. In the following explanation, in order to facilitate understanding of explanation, it is assumed that the dangerous speed in the first embodiment and other embodiments is also 2880 RPM.

In this specification, the case in which the rotating speed for shutting off the fuel is set to 1200 RPM (33% of the rated rotating speed) is explained. However, this shut-off rotating speed is also a numerical value different for each of power generation plants (for each of types of gas turbines). However, the gas turbine that shuts off the fuel at relatively high rotating speed of 70% to 80% of the rated rotating speed is considered to be an extremely rare model type. As reasonable design of a commercial gas turbine, it is a general practice to shut off the fuel at low rotating speed of 30% to 40% of the rated rotating speed. This is because a reason why the fuel is shut off after the rotation drops to 1200 RPM (33% of the rated rotating speed) is to sufficiently reduce the amount of the fuel, set the exhaust gas temperature of the gas turbine to low temperature, and avoid a large burden being applied to the gas turbine in terms of thermal stress and the like. If the fuel is shut off in a high rotation region of 70% to 80%, this means that the fuel still present in a large amount is suddenly shut off. The plant stopping method is strict for the gas turbine. That is, in general, the rotating speed for shutting off the fuel is rotating speed sufficiently low with respect to the high rotating speed of 70% to 80% where the dangerous speed region is present. Accordingly, if the plant stopping method in this embodiment for performing the clutch engagement after the fuel is shut off is adopted, overlapping of the dangerous speed region and the clutch engagement rotating speed is avoided.

In the above explanation, the clutch 120 is engaged at 900 RPM far apart from the dangerous speed region near 2880 RPM in the first embodiment. In this embodiment, the rotating speed at which the clutch 120 is engaged is desirably apart from the dangerous speed by 200 RPM or more and more desirably apart from the dangerous speed by 300 RPM or more. Accordingly, when the dangerous speed is 2880 RPM, the rotating speed at which the clutch 120 is engaged is desirably 2680 RPM or less and more desirably 2580 RPM or less. Consequently, it is possible to suppress the resonance explained above from occurring.

(5) Modification of the First Embodiment

However, depending on a power generation plant, in some case, a plant stopping method according to a modification of the first embodiment explained here is necessary. This is because the power generation plant (the first rotating shaft 118) in this modification has another dangerous speed region in a low rotation region in addition to the dangerous speed in the high rotating speed region of approximately 80% (near 2880 RPM). That is, the first rotating shaft 118 in this modification has dangerous speed at 30% of the rated rotating speed. The 30% rotating speed is 1080 RPM (3600× 0.3).

In the stopping method in the first embodiment, 900 RPM at which the clutch engagement is performed is sufficiently near the rotating speed and corresponds to the dangerous speed region. The bearing vibration is increased by the resonance. Therefore, in this modification, a plant stopping method for performing clutch engagement at 700 RPM far apart from 1080 RPM is adopted. For that purpose, instead of resuming the gas turbine output drop (step S210) when the ST rotating speed drops to 1200 RPM (YES in step S209) in the first embodiment, in this modification, the gas turbine output drop is resumed when the ST rotating speed drops to 1000 RPM. The rotating speed for the clutch engagement drops by 200 RPM according to the drop of 200

RPM of the ST rotating speed and the clutch is engaged at 700 RPM. Consequently, the problem of the overlap of the dangerous speed region and the clutch engagement rotating speed is avoided. In this modification, 1000 RPM is an example of the third rotating speed, 1200 RPM is an example of the first rotating speed, and 700 RPM is an example of the second rotating speed.

It should be noted that a difference between 1080 RPM of the dangerous speed and 700 RPM of the rotating speed at which the clutch 120 is engaged is 380 RPM. Accordingly, the rotating speed at which the clutch 120 is engaged in this case is apart from the dangerous speed by 200 RPM or more and further apart from the dangerous speed by 300 RPM or more.

(6) Study of the First Embodiment

In the first embodiment, the time (T2) required for the drop from 3600 RPM to 1200 RPM decreases but a waiting time (T4) for retaining the gas turbine output at 25 MW increases instead. However, since power generation of 25 MW is performed during the waiting time of T4, the fuel supplied in the period of T4 is not wastefully consumed (like the fuel in T1 in the comparative example). However, on the other hand, it is also true that there is a need for shifting the turbines to the turning operation start (step S221) in as short a time as possible and setting the plant stop time early. Typically, this is for preparing for a desire to quickly start inspection, repairing, maintenance work, and the like of plant equipment. From this viewpoint, the waiting time (T4) at 25 MW has an aspect of extending a time required for the plant stop. A second embodiment explained next is a plant stopping method for realizing improvement of this point.

Second Embodiment

A second embodiment is explained below. The configuration of a power generation plant in the second embodiment is the same as the configuration of the power generation plant 100a in the first embodiment except software implemented on the plant control apparatus 101a. A difference between the software in the first embodiment and the software in the second embodiment is timing when the gas turbine output is dropped from 25 MW. That is, whereas the gas turbine output drop is resumed (step S210) when the ST rotating speed drops to 1200 RPM in the first embodiment, the gas turbine output drop is resumed when the ST rotating speed drops to R1 [RPM] in the second embodiment. In this case, there is a relation of R1>1200 between R1 [RPM] and 1200 RPM. In the second embodiment, since timing for resuming the gas turbine output drop is early, a time required for the plant stop can be reduced. A calculation method for a value of R1 and the like are explained in detail below.

Concerning the plant configuration in this embodiment, please refer to FIG. 1. Concerning a flow of the plant stopping method in this embodiment, please refer to FIG. 2. In this case, for example, "1200 RPM" in step S209 reads "R1 [RPM]" described above.

Figure 4:
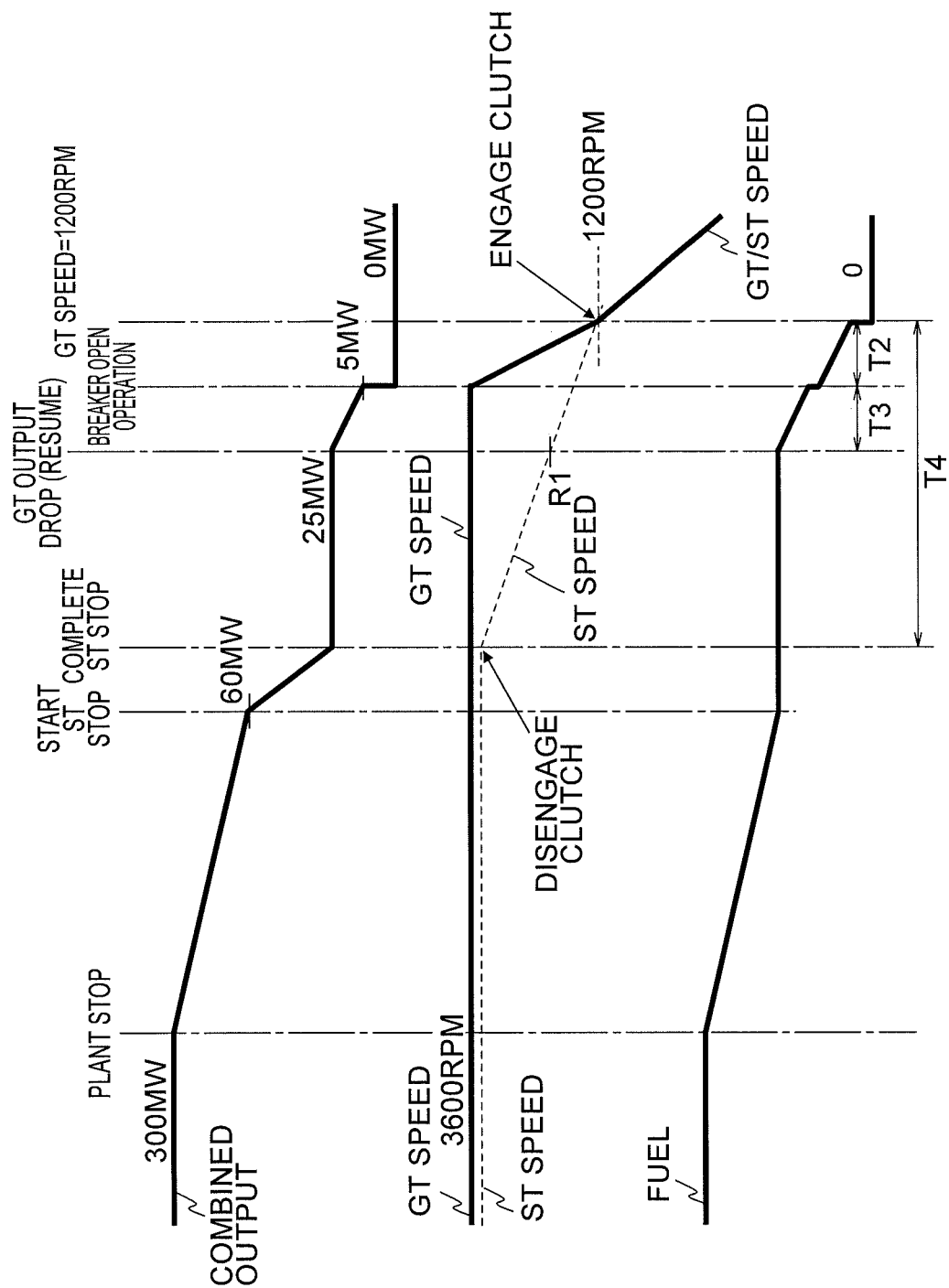
FIG. 4 is a trend graph for explaining a plant stopping method in a second embodiment.

FIG. 4 is a trend graph for explaining the plant stopping method in the second embodiment.

The plant stopping method is explained. Before the plant stop is started, the combined output is 300 MW. When the plant stop is started, the fuel 116 is reduced at a predetermined rate. The combined output gradually decreases from 300 MW.

When the combined output drops to 60 MW (the gas turbine output drops to 25 MW), the reduction of the fuel 116 is once suspended. The stop of the steam turbine (ST) 103 is started. When the stop of the steam turbine 103 is completed, the clutch 120 is disengaged and the ST rotating speed starts to drop from 3600 RPM. The plant stopping procedure explained above is the same as the plant stopping procedure in the first embodiment.

The plant stopping procedure in the second embodiment is different from the plant stopping procedure in the first embodiment in the matters explained below. The ST rotating speed slowly drops at a sluggish rate. When the ST rotating speed drops to R1 [RPM], the gas turbine output drop is resumed. A value of R1 is explained below. R1 [RPM] in this embodiment is an example of the third rotating speed.

When the gas turbine output drop is resumed, the gas turbine output gradually drops from 25 MW and, when dropping to 5 MW, is brought into the breaker open operation. The time (T3) is required until the gas turbine output (the combined output) drops from 25 MW to 5 MW as in the first embodiment.

The GT rotating speed after brought into the breaker open operation drops at a high-speed rate from 3600 RPM and catches up with the ST rotating speed when dropping to 1200 RPM. The rotating speeds of both the turbines coincide. At this time, the clutch 120 is engaged again. At the same time, the fuel 116 is shut off and the gas turbine 102 is stopped. At this time, the time (T2) is required until the GT rotating speed drops from 3600 RPM to 1200 RPM as in the first embodiment. The time (T4) is required until the ST rotating speed drops from 3600 RPM to 1200 RPM as in the first embodiment. Thereafter, in a state in which the clutch 120 is engaged, both the turbines slowly perform the rotation drop and start the turning operation. 1200 RPM in this embodiment is an example of the first rotating speed and is an example of the second rotating speed.

In this way, in the second embodiment, when the GT rotating speed and the ST rotating speed drop to 1200 RPM, the shutoff of the fuel 116 and the engagement of the clutch 120 are simultaneously performed. R1 [RPM] for realizing this can be calculated as explained below.

In FIG. 4, since T4 is required for the ST rotating speed to drop from 3600 RPM to 1200 RPM, a drop rate of the ST rotating speed is represented by the following Expression (1).

$$\text{Drop rate of the } ST \text{ rotating speed} = (3600 - 1200)/T4 \qquad (1)$$
$$= 2400/T4$$

All of the times T4 (and T2 and T3) have a unit of "minute".

Therefore, a time required for the ST rotating speed to drop from R1 [RPM] to 1200 RPM is represented by the following Expression (2) using Expression (1).

$$\text{Time required from } R1 \text{ to } 1200 \ RPM = (R1 - 1200) \div \qquad (2)$$
$$\text{drop rate of the } ST$$
$$\text{rotating speed}$$
$$= (R1 - 1200)T4/2400$$

On the other hand, a time required for the GT rotating speed to drop to 1200 RPM through the breaker open operation from 25 MW after the gas turbine output drop is resumed is represented by the following Expression (3).

Time from 25 MW to 1200 RPM=$T3+T2$ (3)

In the plant stopping method in the second embodiment, timing when the ST rotating speed drops to 1200 RPM and timing when the GT rotating speed drops to 1200 RPM are matched. For that purpose, a relation of Expression (2)=Expression (3) only has to be satisfied. That is, R1 satisfying the following Expression (4) only has to be calculated.

$(R1-1200)T4/2400=T3+T2$ (4)

When Expression (4) is solved, R1 is calculate as Expression (5).

$R1=2400(T3+T2)/T4+1200$ (5)

The magnitude relation is described as R1>1200 above. R1 is rotating speed higher than 1200 RPM by a rotating speed difference represented by the following Expression (6).

Rotating speed difference=$2400(T3+T2)/T4$ (6)

In the second embodiment, the resumption of the gas turbine output drop is started earlier than in the first embodiment by the rotating speed difference of Expression (6). Therefore, the plant stop time is reduced.

To calculate this reduction time, (6) only has to be divided by the drop rate of the ST rotating speed (Expression (1)).

Reduction time=$2400(T3+T2)/T4 \div (2400/T4)=T3+T2$ (7)

(1) Effects and Study of the Second Embodiment

In the second embodiment, the gas turbine stop and the clutch reengagement are simultaneously performed at 1200 RPM. Therefore, it is possible to further reduce the plant stop time than in the first embodiment while eliminating the problems in the comparative example. The reduced time is T3+T2 given by Expression (7). Briefly speaking, this is because, whereas the waiting time for retaining the gas turbine output at 25 MW is T4 in the first embodiment (FIG. 3), the waiting time for retaining the gas turbine output at 25 MW is as short as T4−(T3+T2) in the second embodiment (FIG. 4). This can be easily read from comparison of FIG. 3 and FIG. 4.

When the second embodiment (FIG. 4) and the first embodiment (FIG. 3) are compared in relation to the above, understanding is helped by keeping in mind that times are arranged based on the ST rotating speed. Specifically, in FIG. 4 and FIG. 3, "an hour when the ST rotating speed starts a drop from 3600 RPM" and "an hour when the ST rotating speed reaches 1200 RPM" are the same (the hour in this case is a time (an hour) calculated from 0 set as a start point when the plant stop is started). Therefore, it is possible to perform comparison in a point of view about how early or late the shutoff of the fuel is with respect to an hour when the ST rotating speed reaches 1200 RPM. According to this view, it is also seen that the shutoff of the fuel is earlier in FIG. 4 by (T3+T2) than FIG. 3.

In the comparative example (FIG. 8), an hour when the ST rotating speed starts a drop from 3600 RPM is the same as the hours in the embodiments. However, the hour when the ST rotating speed reaches 1200 RPM is different from the hours in the embodiments (because the drop rate is different from Expression (1) in the clutch engagement). Therefore, this ST rotating speed base cannot be applied.

A plant stopping method in the case in which the shutoff of the fuel is set earlier (earlier than T3+T2) is briefly explained below. In that case, if the gas turbine output drop is resumed at rotating speed higher than R1 calculated by Expression (5) according to a degree of setting the shutoff of the fuel earlier, the shutoff of the fuel can be set earlier. However, in that case, the ST rotating speed and the GT rotating speed coincide at rotating speed equal to or higher than 1200 RPM, that is, the clutch is engaged before the fuel is shut off. Therefore, the plant stopping method is similar to the plant stopping method in the comparative example. This means that T3+T2 is a limit of setting the shutoff of the fuel earlier.

(2) Modification of the Second Embodiment

In the calculation of R1 in the second embodiment, real machine data at the time when the plant is actually stopped (Expression (1) of the drop rate of the ST rotating speed) is necessary. Therefore, when the second embodiment is actually introduced, a sequential approach for provisionally attempting the plant stopping method according to the first embodiment first and, after acquiring the real machine data, shifting to the second embodiment is necessary. In that case, the drop graph of the ST rotating speed in FIG. 4 (and FIG. 3) is represented by a straight line downward to the right. However, actually, the ST rotating speed drops in a curve shape slightly formed in a concave shape. Therefore, R1 calculated assuming a "straight line" has an error, although the error is very small. Considering this, it is realistic to give an appropriate margin to actually applied R1, set R1 to rotating speed lightly lower than R1 calculated by Expression (5) described above, and perform the clutch engagement at rotating speed slightly lower than 1200 RPM. With the stopping method according to this modification, after the fuel shutoff (the gas turbine stop) is performed at 1200 RPM, the clutch engagement is performed when approximately several seconds elapses. Accordingly, an effect of separating mechanical shocks (the gas turbine stop and the clutch engagement) to the turbine equipment with a time difference and reducing the mechanical shocks can also be expected. Therefore, a more desirable stop is performed. The reduction effect for the plant stop time is slightly reduced from Expression (7) but the reduction would be sufficiently justified.

Third Embodiment

Figure 5:
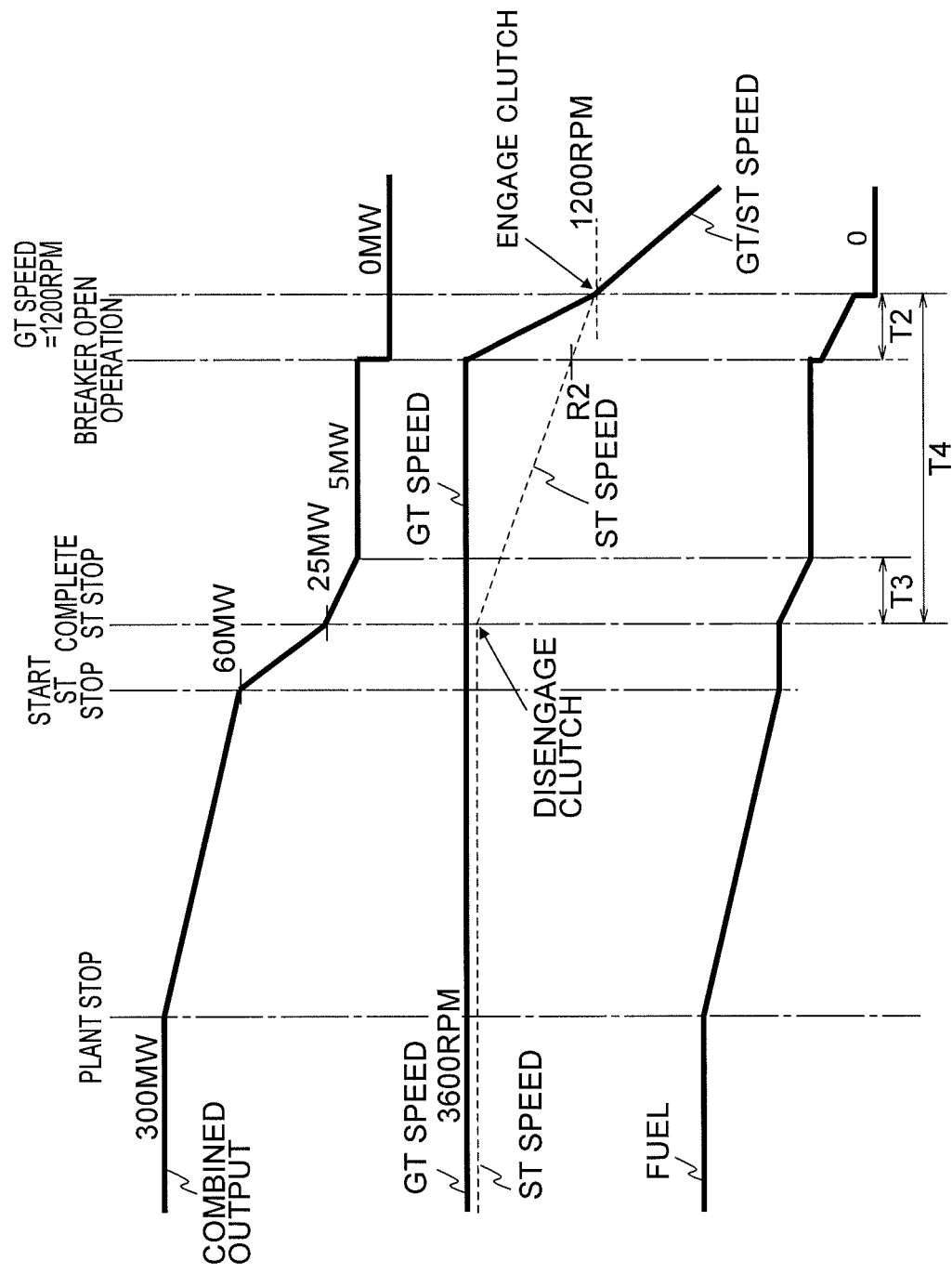
FIG. 5 is a trend graph for explaining a plant stopping method in a third embodiment.

FIG. 5 is a trend graph for explaining a plant stopping method in a third embodiment.

The third embodiment is similar to the second embodiment but is a plant stopping method for saving of fuel. Therefore, while the drop of the ST rotating speed is waited, whereas the gas turbine output is retained at 25 MW in the second embodiment, the gas turbine output is retained at 5 MW to achieve saving of fuel in the third embodiment.

Concerning a plant configuration in this embodiment, please refer to FIG. 1. Concerning a flow of the plant stopping method in this embodiment, please refer to FIG. 2. In this case, for example, "1200 RPM" in step S209 reads "R2 [RPM]" explained below.

FIG. 5 is explained below. Before the plant stop is started, the combined output is 300 MW. When the plant stop is started, the fuel 116 is reduced at a predetermined rate. The combined output gradually decreases from 300 MW.

When the combined output drops to 60 MW (the gas turbine output drops to 25 MW), the reduction of the fuel 116 is once suspended. The stop of the steam turbine (ST) 103 is started. When the stop of the steam turbine 103 is completed, the clutch 120 is disengaged and the ST rotating speed starts to drop from 3600 RPM. A plant stopping procedure explained above is the same as the plant stopping procedure in the second embodiment.

The plant stop procedure in the third embodiment is different from the second embodiment in matters explained below. When the stop of the steam turbine 103 is completed, the gas turbine output drop is immediately resumed. When the gas turbine output drop is resumed, the gas turbine output gradually drops from 25 MW and is retained at 5 MW when dropping to 5 MW. At this time, the time (T3) is required until the gas turbine output drops from 25 MW to 5 MW as in the second embodiment. The ST rotating speed slowly drops at a sluggish rate even in the time and is brought into the breaker open operation when dropping to R2 [RPM]. A value of R2 is explained below. R2 [RPM] in this embodiment is an example of the third rotating speed.

The GT rotating speed after brought into the breaker open operation drops from 3600 RPM at a high-speed rate. When the GT rotating speed drops to 1200 RPM, the GT rotating speed catches up with the ST rotating speed, the rotating speeds of both the turbines coincide, and the clutch 120 is engaged again at this time. At the same time, the fuel 116 is shut off and the gas turbine 102 is stopped. At this time, the time (T2) is required until the GT rotating speed drops from 3600 RPM to 1200 RPM as in the second embodiment. The time (T4) is required until the ST rotating speed drops from 3600 RPM to 1200 RPM as in the second embodiment. Thereafter, in a state in which the clutch 120 is engaged, both the turbines slowly perform the rotation drop and start the turning operation. 1200 RPM in this embodiment is an example of the first rotating speed and is an example of the second rotating speed.

In this way, in the third embodiment, as in the second embodiment, when the GT rotating speed drops to 1200 RPM, the gas turbine stop and the clutch engagement are simultaneously performed. R2 [RPM] for realizing this can be calculated as explained below as in the calculation of R1 (a calculation process is omitted).

$$R2=2400(T2/T4)+1200 \quad (8)$$

(1) Effects and Study of the Third Embodiment

In the third embodiment, since the gas turbine output is retained at 5 MW, the fuel may be less than the fuel in the second embodiment in which the gas turbine output is retained at 25 MW. The fuel can be saved and an economical plant stopping method can be realized.

However, on the other hand, since 5 MW is 2.5% (an operation region generally called extremely low load) of the gas turbine rated output of 200 MW, depending on a case, it is likely that stable operation of the gas turbine is hindered in the third embodiment. For example, when so-called system disturbance occurs in the system grid 129, a system frequency greatly fluctuates and DROOP control included in gas turbine control suddenly reduces the fuel, leading to, in the worst case, the breaker open operation because of reverse power.

Compared with this, in the second embodiment in which the gas turbine output is retained at 25 MW, even if the sudden reduction of the fuel due to the same DROOP control occurs, this does not lead to the breaker open operation because of reverse power at higher 25 MW. The power generation operation of the gas turbine is more stable.

Numerical values of 5 MW and 25 MW (the gas turbine output retained while the drop of the ST rotating speed is waited) used in this specification are only examples for convenience of explanation. However, irrespective of which of the first to third embodiments is adopted, values of the gas turbine output equivalent to 5 MW and 25 MW need to be carefully selected from the viewpoint of tradeoff between stability of the gas turbine operation and economy.

The plant stop time is compared between the third embodiment (FIG. 5) and the second embodiment (FIG. 4) below. The times being based on the ST rotating speed as explained above is applied to this case as well. An hour when the ST rotating speed reaches 1200 RPM is the same hour (time when T4 elapses from the ST stop completion) in FIG. 5 and FIG. 4. That is, in both the embodiments, the shutoff of the fuel is performed at the same hour and the plant stop time is the same. At a glance, since a process for reducing the gas turbine output from 25 MW to 5 MW (equivalent to the time T3) is performed in precedence, it seems as if the third embodiment enables an earlier plant stop. However, since R2 given by Expression (8) is rotating speed (a later hour) lower than R1 given by Expression (7), the plant stop times in both the embodiments are the same. If R2 higher than (an hour earlier than) Expression (8) is set and the breaker open operation is performed, the ST rotating speed and the GT rotating speed coincide at rotating speed equal to or higher than 1200 RPM. That is a plant stopping method in which the clutch is engaged before the fuel is shut off and is not a desirable stopping method.

(2) Modification of the Third Embodiment

R2 calculated in this embodiment has a slight error like R1 in the second embodiment. Considering this, a modification of the third embodiment gives an appropriate margin to actually applied R2 and sets R2 to rotating speed lightly lower than R2 calculated by Expression (8) described above such that the clutch engagement is performed at rotating speed slightly lower than 1200 RPM. This modification is a more realistic and more desirable stopping method as in the modification of the second embodiment.

While certain embodiments have been described, these embodiments have been presented by way of example only, and are not intended to limit the scope of the inventions. Indeed, the novel apparatus, methods and plants described herein may be embodied in a variety of other forms; furthermore, various omissions, substitutions and changes in the form of the apparatus, methods and plants described herein may be made without departing from the spirit of the inventions. The accompanying claims and their equivalents are intended to cover such forms or modifications as would fall within the scope and spirit of the inventions.

The invention claimed is:

1. A plant control apparatus configured to control a power generation plant, the plant comprising:
   a combustor configured to burn fuel;
   a gas turbine configured to be driven by combustion gas supplied from the combustor;
   an exhaust heat recovery boiler configured to generate steam using heat of exhaust gas discharged from the gas turbine;
   a steam turbine configured to be driven by the steam supplied from the exhaust heat recovery boiler;
   a first shaft coupled to the gas turbine;
   a second shaft coupled to the steam turbine; and
   a clutch configured to connect the first shaft and the second shaft with engagement, when rotating speed of the first shaft catches up with rotating speed of the second shaft, the apparatus comprising:
a first stop controller configured to, when stopping the power generation plant, stop the steam turbine to start to drop the rotating speed of the second shaft from rated rotating speed, and start to drop the rotating speed of the first shaft from the rated rotating speed while continuing combustion of the combustor after the stop of the steam turbine; and
a second stop controller configured to shut off the fuel of the combustor to stop the gas turbine when the rotating speed of the first shaft drops to first rotating speed, the second stop controller being configured to stop the gas turbine such that the rotating speed of the first shaft catches up with the rotating speed of the second shaft at second rotating speed that is equal to or lower than the first rotating speed and the clutch is engaged.

2. The apparatus of claim 1, wherein the first stop controller drops the rotating speed of the first shaft from the rated rotating speed to the first rotating speed, while the clutch is disengaged.

3. The apparatus of claim 1, wherein
the second rotating speed is lower than the first rotating speed, and
the clutch is engaged after the fuel of the combustor is shut off.

4. The apparatus of claim 1, wherein
the second rotating speed is same as the first rotating speed, and
the clutch is engaged simultaneously with when the fuel of the combustor is shut off.

5. The apparatus of claim 1, wherein the first stop controller starts to drop the rotating speed of the first shaft from the rated rotating speed, when the rotating speed of the second shaft drops to a third rotating speed.

6. The apparatus of claim 5, wherein the third rotating speed is equal to or lower than the first rotating speed.

7. The apparatus of claim 5, wherein the third rotating speed is higher than the first rotating speed.

8. The apparatus of claim 1, wherein
the first shaft has dangerous speed that depends on a resonance frequency of the first shaft, and
the second rotating speed is lower than the dangerous speed.

9. The apparatus of claim 8, wherein a difference between the dangerous speed and the second rotating speed is 200 RPM or more.

10. A plant control method of controlling a power generation plant, the plant comprising:
a combustor configured to burn fuel;
a gas turbine configured to be driven by combustion gas supplied from the combustor;
an exhaust heat recovery boiler configured to generate steam using heat of exhaust gas discharged from the gas turbine;
a steam turbine configured to be driven by the steam supplied from the exhaust heat recovery boiler;
a first shaft coupled to the gas turbine;
a second shaft coupled to the steam turbine; and
a clutch configured to connect the first shaft and the second shaft with engagement, when rotating speed of the first shaft catches up with rotating speed of the second shaft,
the method comprising:
when stopping the power generation plant, stopping the steam turbine to start to drop the rotating speed of the second shaft from rated rotating speed, and starting to drop the rotating speed of the first shaft from the rated rotating speed while continuing combustion of the combustor after the stop of the steam turbine; and
shutting off the fuel of the combustor and stopping the gas turbine when the rotating speed of the first shaft drops to first rotating speed, and at this time, stopping the gas turbine such that the rotating speed of the first shaft catches up with the rotating speed of the second shaft at second rotating speed that is equal to or lower than the first rotating speed and the clutch is engaged.

11. A power generation plant comprising:
a combustor configured to burn fuel;
a gas turbine configured to be driven by combustion gas supplied from the combustor;
an exhaust heat recovery boiler configured to generate steam using heat of exhaust gas discharged from the gas turbine;
a steam turbine configured to be driven by the steam supplied from the exhaust heat recovery boiler;
a first shaft coupled to the gas turbine;
a second shaft coupled to the steam turbine;
a clutch configured to connect the first shaft and the second shaft with engagement, when rotating speed of the first shaft catches up with rotating speed of the second shaft;
a first stop controller configured to, when stopping the power generation plant, stop the steam turbine to start to drop the rotating speed of the second shaft from rated rotating speed, and start to drop the rotating speed of the first shaft from the rated rotating speed while continuing combustion of the combustor after the stop of the steam turbine; and
a second stop controller configured to shut off the fuel of the combustor and stops the gas turbine when the rotating speed of the first shaft drops to first rotating speed, the second stop controller being configured to stop the gas turbine such that the rotating speed of the first shaft catches up with the rotating speed of the second shaft at second rotating speed that is equal to or lower than the first rotating speed and the clutch is engaged.

* * * * *